Jan. 8, 1952   B. DARROW   2,581,914
APPARATUS FOR FILLING TIRES WITH A LIQUID
Filed June 20, 1945   4 Sheets-Sheet 1
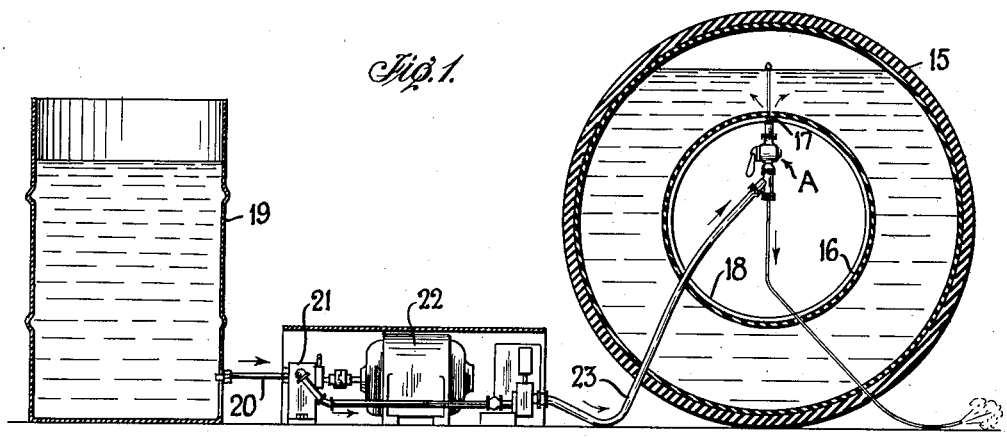
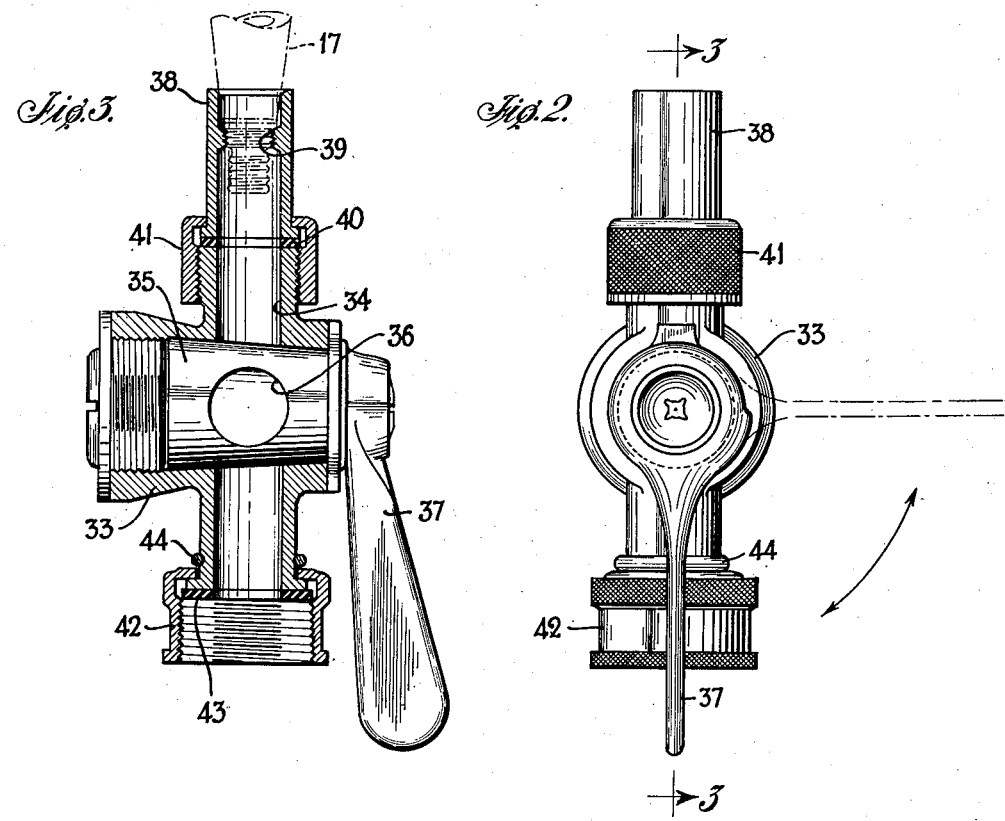
INVENTOR
BURGESS DARROW
BY
ATTORNEYS

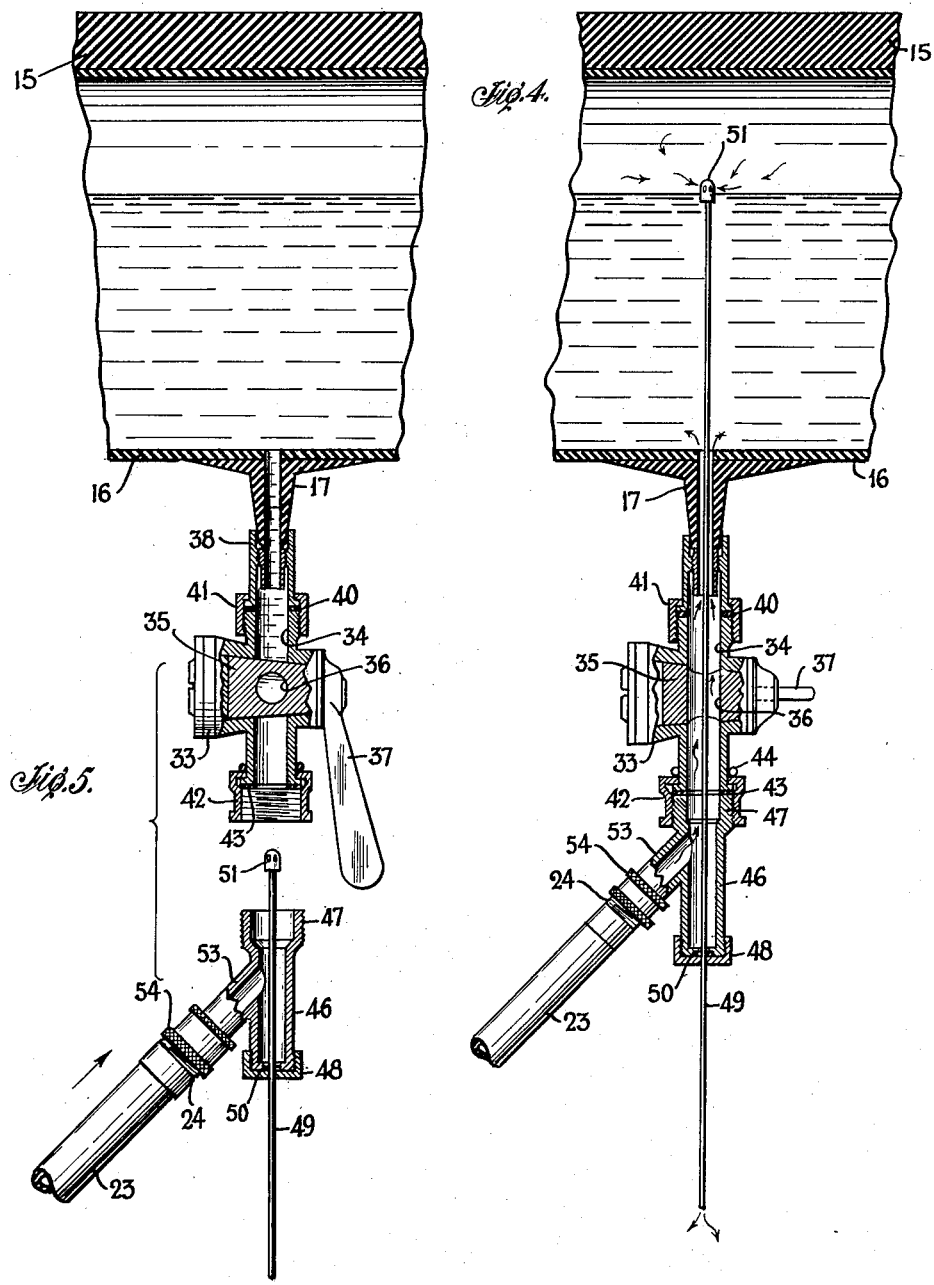

Jan. 8, 1952          B. DARROW          2,581,914
APPARATUS FOR FILLING TIRES WITH A LIQUID
Filed June 20, 1945          4 Sheets-Sheet 3
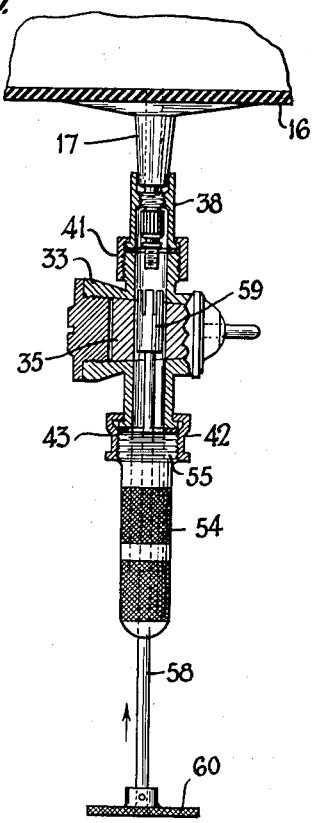
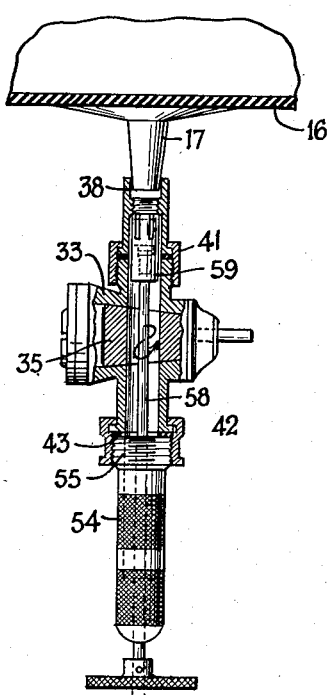
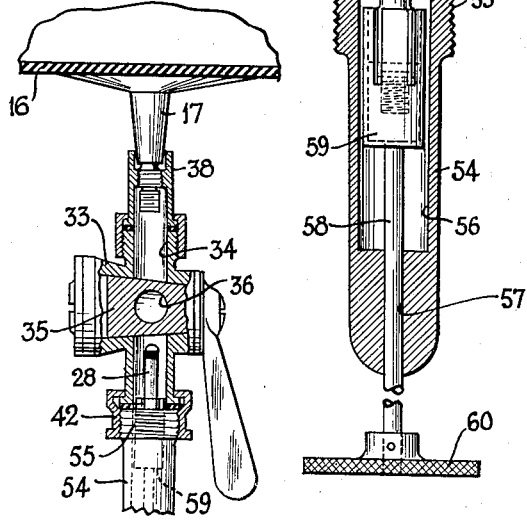
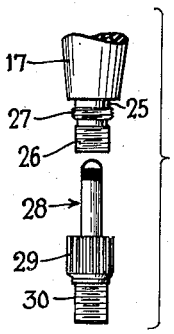
INVENTOR
BURGESS DARROW Jan. 8, 1952  B. DARROW  2,581,914
APPARATUS FOR FILLING TIRES WITH A LIQUID
Filed June 20, 1945  4 Sheets-Sheet 4
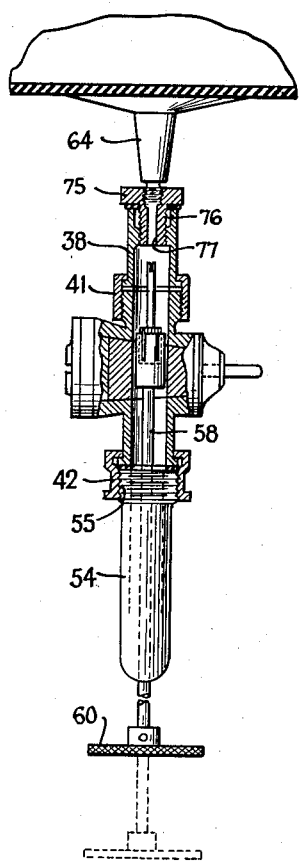
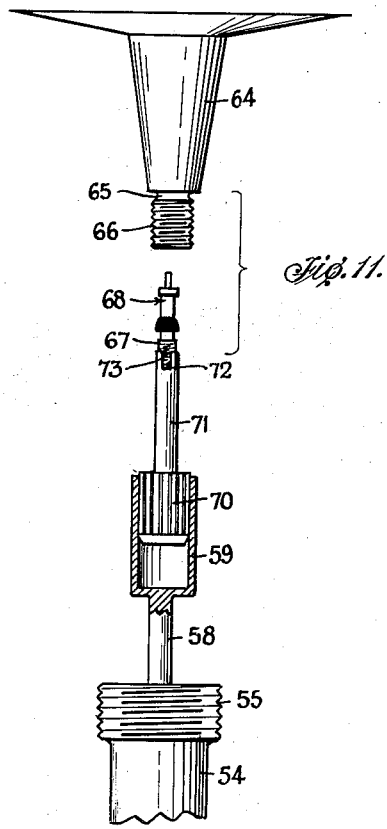
INVENTOR
BURGESS DARROW
BY
ATTORNEYS Patented Jan. 8, 1952

2,581,914

UNITED STATES PATENT OFFICE 2,581,914

APPARATUS FOR FILLING TIRES WITH A LIQUID

Burgess Darrow, Akron, Ohio, assignor to The Firestone Tire & Rubber Company, Akron, Ohio, a corporation of Ohio Application June 20, 1945, Serial No. 600,568

4 Claims. (Cl. 226—20.8)

This invention relates to improved apparatus for use in filling vehicle tires with water or other liquid, and more especially it relates to tire filling apparatus adapted to fill only a determinate portion of the interior of the tire with the liquid.

Rubber-tired tractors required to draw heavy loads over soft or loose soil frequently are in difficulty, due to lack of traction. This difficulty is remedied, to some extent, by providing the tires with traction lugs or ribs of greater height than the traction elements of tires designed to travel on hard-surfaced roadways. Another expedient for the purpose mentioned is to add weight to the tires, and in some instances this has been accomplished by securing one or more heavy metal discs to the wheels of the tractor. However, a simpler and less expensive method of weighting tires is partly or entirely to fill the tires with liquid, and it is to the improvement of apparatus for performing this operation that this invention primarily is directed.

Since liquid-filled tires may be required to operate in cold weather, it is desirable that the liquid employed be such that will not freeze except at abnormally low temperatures. For this reason it is common practice to use an aqueous salt solution of low freezing point for the tire-weighting liquid. Because of its cheap cost and ready availability, calcium chloride solution is most commonly employed. However, the use of this material is attended with the objection that it is injurious to the hands, and also will destroy clothing and shoes. Accordingly it is one of the chief objects of this invention to provide improved tire filling apparatus of the character mentioned that will enable the tire to be filled and capped without the loss of any of the fluid.

Other important objects of the invention are to provide apparatus of the character mentioned by which a tire may be filled with the desired quantity of liquid in a relatively brief time; that may be employed for removing liquid from tires if desired; that automatically fills tires with liquid to the desired level whereby a determinate quantity of air may remain in the tire to absorb shocks, soften jolts and jars, lengthen the life of the tires, and improve riding qualities; and to provide apparatus that will evacuate air from a tire concurrently with the filling of the tire with the liquid. Other objects will be manifest as the description proceeds.

Of the accompanying drawings:

Fig. 1 is an elevation of apparatus of the invention in operative association with a vehicle tire (shown in section), a pump (shown in elevation), and a container of liquid (shown in section), the view depicting the injecting of liquid into the tire;

Fig. 2 is an elevation of one of the elements of the apparatus shown in Fig. 1, as viewed from the left thereof, on a larger scale;

Fig. 3 is a section on the line 3—3 of Fig. 2;

Fig. 4 is a longitudinal section of the three elements of the apparatus of the invention shown in Fig. 1, on a larger scale, and a fragmentary portion of a tire, in operative association during the filing of the tire with liquid;

Fig. 5 is a sectional view similar to Fig. 4 showing how the bleeder tube is removed from the filled tire;

Fig. 6 is a fragmentary elevation of the outer end portion of the special valve stem provided for large tractor tires, and the valve mechanism thereof shown in disassembled relation therewith;

Fig. 7 is a longitudinal section through another element of the apparatus of the invention, and the valve mechanism of a tractor tire operatively engaged thereby;

Fig. 8 is a view showing the elements of Fig. 3 and Fig. 7 assembled in operative association, during the initial phase of replacing a valve mechanism within the valve stem of a tire after the latter has been filled with liquid;

Fig. 9 and Fig. 10 are views of the structures shown in Fig. 8, showing an intermediate phase and the final phase respectively of the valve replacing operation;

Fig. 11 is a detail view of a modified member for replacing conventional tire valve mechanism in a tire valve; and Fig. 12 is a view of the member shown in Fig. 11, on a smaller scale, in operative association with other elements of the apparatus, shown in section, and a tire valve stem to which the apparatus is connected for the purpose of replacing the valve mechanism in said stem.

Referring to Fig. 1 of the drawings, there is shown apparatus embodying the invention as it is employed in the filling of a tire with liquid, said tire being designated 15, the inner tube therein being designated 16 and its valve stem 17, and the metal rim on which the tire is mounted being indicated at 18. The liquid for weighting the tire is supplied in a container or drum 19, and is withdrawn therefrom through a pipe or duct 20 connected to the inlet port of a pump 21. Said pump is driven by a suitable reversible electric motor 22, and has an outlet port that is in communication with a flexible discharge hose 23. The motor may be operated from any convenient 110 volt power line. The apparatus of the invention shown in Fig. 1 is designated as a whole by character A and is located between the valve stem 17 of the tire 15 and the discharge end of the hose 23, which end of the hose is provided with a male union member 24.

The valve stem 17 employed with the inner tubes 16 of large agricultural tires is somewhat different from the conventional valve stems of the smaller passenger vehicle tires. As best shown in Fig. 6 the valve stem 17, which is composed principally of molded rubber, includes a tubular axial metal insert 25 that extends beyond the outer end of the stem, and is formed exteriorly with a threaded terminal portion 26, and a threaded portion 27 of larger diameter and shorter length rearwardly of said terminal threads. The valve mechanism which is receivable within the tubular insert 25, is designated as a whole by the numeral 28. It comprises an interiorly threaded, externally fluted nut portion 29 that normally is threaded onto the terminal portion 26 of the insert 25, said valve mechanism having a threaded terminal portion 30 upon which a valve cap (not shown) may be mounted. The valve mechanism 28 is removed during the tire-filling operation, this being readily accomplished simply by unthreading its nut portion 29 from the threaded portion 26 of The apparatus of the invention comprises a valve structure that is best shown in Figs. 2 and 3. As shown, said valve structure comprises a housing 33 having an axial bore or passage 34 extending longitudinally therethrough, and having a plug valve 35 intersecting said passage. The plug valve is formed with a transverse bore 36 at least as large in diameter as the passage 34. Exteriorly of the housing a lever or crank 37 is provided by which the plug valve may be turned so as either to obstruct or open the passage 34, a turning movement of only 90° being required for this purpose. Removably mounted upon one end of the housing 33 is a tubular adapter 38 that is adapted partly to telescope over the valve stem 17 of the tire 15, and formed interiorly with female threads 39 adapted for engagement with the threads 27 of the valve stem insert 25, whereby said adapter has fluid-tight connection with said valve stem. An annular gasket 40 is mounted between the confronting end faces of the housing 33 and adapter 38, and the latter is attached to the housing by a conventional union or coupling 41 that engages a shoulder on the adapter and is threaded onto said housing. The opposite end of the housing 33 carries a rotatable female threaded union member 42 in which the coupling member 24 of hose 23 is engageable upon occasion, as subsequently will be explained. The union member 42 includes the usual gasket 43 and it is secured on the housing by the usual split ring 44.

The filling of the tire 15 with liquid may be accomplished by two different methods. In one method, after the valve mechanism 28 is removed, the plug valve structure is secured to the valve stem 17 through the agency of adapter 38, and the hose 23 is connected to the plug valve structure by means of their complemental couplings 24, 42. With the plug valve turned to open position, the motor 22 is operated in the direction so that the pump 21 operates as a suction producing means to withdraw air from the tire. As soon as the air is substantially exhausted therefrom, the direction of the motor 22 is reversed and the pump 21 functions to withdraw liquid from the container 19 and to discharge said liquid into the tire. Thereafter the valve mechanism 28 is replaced in the valve stem 17 in a novel manner presently to be described. In the alternative and preferred method of filling the tire with liquid, the initial step of evacuating the tire of air is not employed. Instead a bleeder tube is provided which vents air from the tire concurrently with the admission of the liquid thereto. The valve mechanism is replaced in the same manner as in the previously described method.

The mechanism whereby a bleeder tube is employed in the manner set forth is shown in elevation in Fig. 1 and in sectional detail in Figs. 4 and 5. Said mechanism comprises a tubular coupling 46, one end portion of which is provided exteriorly with screw threads 47 by means of which the coupling may be connected to the valve housing 33 through the agency of the union member 42. The opposite end portion of the coupling 46 has an axially apertured cap 48 threaded thereon, through which cap extends an elongate bleeder tube 49. A gasket 50 compressed between the cap 48 and the end of the coupling 46 embraces the bleeder tube and prevents the escape of liquid along the exterior thereof, yet enables the bleeder tube to be moved axially relatively of the coupling. One end of the bleeder tube is provided with a terminal knob or head 51 that has transverse apertures therein so that fluid may enter the tube from the sides thereof, thus obviating obstructing of the opening in the end of the tube. When the housing 33 is mounted on the valve stem 17 and the coupling 46 is mounted on said housing, and the plug valve 35 is in open position, as shown in Fig. 4, the bleeder tube may be moved axially until one end thereof enters the tire 15 to the extent desired, the terminal head 51 on the bleeder tube passing readily through the bore 36 in the plug valve and through the axial opening in the valve stem 17. The coupling 46 has a branch duct 53 extending obliquely therefrom, the end of said duct being provided with a threaded female union member 154 in which the union member 24 of the hose 23 is receivable.

When the tire 15 is to be filled with liquid by means of apparatus employing the bleeder tube 49, the tire is arranged with the valve stem 17 at the top thereof, and the bleeder tube inserted into the tire to the extent desired, as shown in Fig. 4. Liquid entering the apparatus through pipe 23 will fill the tire with liquid, the air displaced by the liquid being vented through the bleeder tube, the discharge end of which may be located at any convenient spot. When the liquid entering the tire reaches the level of the terminal head 51 of the bleeder, it will begin to discharge through the bleeder tube, thereby informing the operator that the tire is filled to the desired extent. The operator will then stop the motor 22 to discontinue the pumping of the liquid. It will be apparent that the feature of providing a bleeder tube with optionally positionable inlet end enables the tire to be filled with liquid to a determinate extent, whereby the amount of air remaining in the tire is closely controlled and optimum resilience in the filled tire is attained. After the tire 15 has been filled with liquid in the manner described by the apparatus shown, the bleeder tube is withdrawn until its terminal head 51 passes through the bore 36 of the plug valve 35. The latter is then turned through an angle of 90° to close the passage 34 of the housing 33, after which the coupling 46, with bleeder tube 49 therein, may be removed from the housing structure 33, as shown in Fig. 5, without the spilling of any more liquid than is contained in the coupling 46.

Thereafter the valve mechanism 28 is replaced within the valve stem 17, and this also is accomplished with the loss of but a modicum of liquid. To this end the apparatus is provided with the valve replacing mechanism shown in Figs. 7 to 10 inclusive. As shown in said figures, said mechanism comprises a generally cylindrical cap 54, one end of which is exteriorly threaded at 55 so as to be received in union 42 of the plug valve housing whereby said cap is operatively associated with the latter. The cap 54 is formed throughout the major portion of its length with an axial recess 56, the remainder of its length being formed with an axial bore 57 of smaller diameter than said recess. Slidably mounted for axial and rotary movement in said bore 57 is an operating rod 58 on one end of which is mounted a collet-like grappler 59, the other end of said rod carrying a knob or disc 60 that may be gripped by the hand of the operator. The grappler 59 is of smaller diameter than the recess 56 so that it may be drawn thereinto if necessary, and it is also smaller in diameter than the passage 34 of the plug valve housing 33 and the bore 36 in the plug valve, for reasons presently to be explained. The said grappler is so constructed and designed as to receive a valve mechanism 28 and frictionally to grip the fluted nut portion 29 of said mechanism with sufficient firmness to enable the said nut portion to be threaded onto the threaded portion 26 of the valve stem insert.

The manner of using the valve-replacing mechanism is as follows: The valve mechanism 28, after its removal from the valve stem 17, is manually inserted into the grappler 59. After the tire 15 has been filled with liquid by either of the methods heretofore described, and the bleeder tube coupling and/or the hose 23 has been disconnected from the plug valve housing 33, the cap 54 is connected to the latter by means of the union 42, as shown in Fig. 8, it being understood that at this time the plug valve is turned to the position that closes passage 34 of the plug valve housing. Thereafter the plug valve is turned to the position shown in Fig. 9 to open the passage 34, after which the rod 58 is pushed inwardly to carry the valve mechanism 28 into engagement with the valve stem 17. A few turns of the rod 58 will suffice to thread the nut portion 29 of the valve mechanism onto the threaded portion 26 of the valve stem, after which an outward pull on the rod 58 will disengage the grappler 59 from the valve mechanism 28, as shown in Fig. 10. This completes the operation of filling the tire with liquid, and the cap 54 may now be removed from the valve housing 33, or the latter and the cap 54 may be removed as a unit from the valve stem 17.

The apparatus enables tires to be filled to a determinate degree with liquid in relatively short time, and with but little spilling of the liquid, and achieves the other advantages set out in the foregoing statment of objects.

Although the apparatus is designed primarily for the filling of large tractor-size tires with liquid, it may, with small additional equipment, be adapted for the filling of conventional tires of the sizes used on passenger automobiles. Such modification of the apparatus is required because of the different type of inner tube valve employed with the tires of the smaller sizes, such a valve being best shown in Fig. 11 of the drawings. As shown in said figure, the valve comprises a rubber valve stem 64 having a metal insert 65 projecting from the outer end thereof, which insert is exteriorly threaded at 66 to receive a valve cap (not shown). The insert 65 also is formed with internal threads (not shown) for engagement with an externally threaded portion 67 of valve mechanism 68.

The apparatus comprises all of the elements previously described, and in addition includes an element especially designed for operative engagement with the valve stem 64, and an element especially designed for operative engagement with the valve mechanism 68. The last mentioned element, which is best shown in Fig. 11, comprises a generally cylindrical body portion 70 that is receivable within the grappler 59, said body portion being exteriorly fluted or roughened so as to have good frictional engagement with the grappler. Said body 70 is formed with an axially arranged stem 71 that projects outwardly from the grappler and has its free end diametrically slotted at 72 to receive and grip the tenon 73 formed on the threaded portion 67 of the valve mechanism 68.

The element that engages the valve stem 64 is an extension to the adapter 38. It is shown in section in Fig. 12 and is designated as a whole by the numeral 75. The extension 75 is exteriorly threaded at 76 for engagement with the threads 39 in the adapter, and is formed with an axial passage 77 the outer end portion of which is interiorly threaded for engagement with the threaded portion 66 of the valve stem insert 65. The passage 77 is of sufficient size to admit the valve mechanism 68 and the stem 71 carrying the same, whereby said valve mechanism may be remounted in the valve stem in essentially the same manner as described in relation to the larger tractor size tire valves.

The present invention has been illustrated as applicable to tires having inner tubes but it will be obvious to those familiar to the art that it is equally applicable to tubeless tires.

Other modification may be resorted to without departing from the spirit of the invention, or the scope thereof as defined by the appended claims.

What is claimed is:

1. In apparatus for use in filling tires with liquid, the combination of a housing having an axial passage therethrough, means on one end of the housing adapted for fluid tight connection with the valve stem of a tire, a plug valve in said housing for controlling the flow of liquid through said passage, and a member removably mountable on the opposite end of said housing, said member including an element extending therethrough and movable relatively thereof in axial alignment with the housing passage, and of such size as to be capable of passing through the plug valve when the latter is in open position, a plurality of such members being provided for engagement with said housing to perform different actions in filling and sealing the tire.

2. In apparatus for use in filling tires with liquid, the combination of a housing having an axial passage therethrough, means on one end of the housing adapted for fluid tight connection with the valve stem of a tire, a plug valve in said housing for controlling the flow of liquid through said passage, and a member mountable on the opposite end of said housing, said member including an element extending therethrough and movable relatively thereof in axial alignment with the housing passage, and of such size as to be capable of passing through the plug valve when the latter is in open position, said movable element being a bleeder tube slidably mounted in said member, and a hose connected on said member to enable passing of liquid through said member, exteriorly of said bleeder tube, whereby said liquid passes into the housing and into the tire.

3. In apparatus for use in filling tires with liquid, the combination of a housing having an axial passage therethrough, means on one end of the housing adapted for fluid-tight connection with the valve stem of a tire, a plug valve in said housing for controlling the flow of liquid through said passage, said plug valve having a transverse bore therethrough at least as large in diameter as said passage, an axially elongate cap removably mounted on the opposite end of said housing, an axially disposed rod journaled for longitudinal and rotary movement in said cap, and a grapper on the inner end of said rod adapted to pass into the housing passage and through said plug valve, said cap being formed with an axial recess within which the grapple is received, a member receivable in said grapple so as to be held thereby, said member being formed with an axial stem that has its end portion slotted for engagement with the valve mechanism of a tire valve.

4. In apparatus for use in filling tires with liquid, the combination of a housing having an axial passage therethrough, means on one end of the housing adapted for fluid tight connection with the valve stem of a tire, a plug valve in said housing for controlling the flow of liquid through said passage, and a member mountable on the opposite end of said housing, said member including an element extending therethrough and movable relatively thereof in axial alignment with the housing passage, and of such size as to be capable of passing through the plug valve when the latter is in open position, said movable element being a bleeder tube slidably mounted in said member, and a hose connection on said member to enable passing of liquid through said member, exteriorly of said bleeder tube, said bleeder tube terminating at its inner end in a transversely apertured knob, said apparatus communicating with the inside of the tire through the said valve stem, whereby said liquid passes into the housing and into the tire, and the air trapped in the tire by incoming liquid is open to the atmosphere through said bleeder tube at all times that the said knob is not submerged in said liquid.

BURGESS DARROW.

REFERENCES CITED

The following references are of record in the file of this patent:

UNITED STATES PATENTS

| Number | Name | Date |
| --- | --- | --- |
| 571,077 | Sheridan | Nov. 10, 1896 |
| 840,469 | Berry | Jan. 8, 1907 |
| 1,181,910 | McGilvray | May 2, 1916 |
| 1,736,561 | Wattel | Nov. 19, 1929 |
| 1,996,345 | Mueller | Apr. 2, 1935 |
| 2,187,838 | Penick et al. | Jan. 23, 1940 |
| 2,237,207 | Zimmerman et al. | Apr. 1, 1941 |
| 2,250,244 | Yancey | July 22, 1941 |
| 2,311,901 | Palko | Feb. 23, 1943 |
| 2,320,042 | McMahan | May 25, 1943 |
| 2,334,110 | McMahan | Nov. 9, 1943 |
| 2,349,594 | McMahan | May 23, 1944 |
| 2,415,019 | McMahan | Jan. 28, 1947 |